(12) United States Patent
Bishop et al.

(10) Patent No.: US 10,869,195 B2
(45) Date of Patent: Dec. 15, 2020

(54) NETWORK ASSISTED VALIDATION OF SECURE CONNECTION TO CELLULAR INFRASTRUCTURE

(71) Applicant: T-Mobile USA, Inc., Bellevue, WA (US)

(72) Inventors: Michael Bishop, Bellevue, WA (US); Andrew Watts, Seattle, WA (US); Shawn Corey, Kenmore, WA (US)

(73) Assignee: T-MOBILE USA, INC., Bellevue, WA (US)

( * ) Notice: Subject to any disclaimer, the term of this patent is extended or adjusted under 35 U.S.C. 154(b) by 244 days.

(21) Appl. No.: 15/960,420

(22) Filed: Apr. 23, 2018

(65) Prior Publication Data
US 2019/0327612 A1    Oct. 24, 2019

(51) Int. Cl.
*H04W 12/06* (2009.01)
*H04W 76/11* (2018.01)
*H04L 29/06* (2006.01)
*H04W 12/08* (2009.01)
*H04W 88/08* (2009.01)
*H04W 88/02* (2009.01)

(52) U.S. Cl.
CPC ......... *H04W 12/06* (2013.01); *H04L 63/0884* (2013.01); *H04W 12/08* (2013.01); *H04W 76/11* (2018.02); *H04L 2209/80* (2013.01); *H04W 88/02* (2013.01); *H04W 88/08* (2013.01)

(58) Field of Classification Search
CPC ..... H04W 12/06; H04W 12/08; H04W 76/11; H04W 36/00; H04W 12/00; H04W 28/02; H04W 12/1202; H04W 12/1008; H04W 88/08; H04W 12/1004; H04L 63/0884; H04L 29/06; H04L 63/14; H04L 63/126; H04Q 7/38
See application file for complete search history.

(56) References Cited

U.S. PATENT DOCUMENTS

| | | | | |
|---|---|---|---|---|
| 2006/0274643 | A1* | 12/2006 | Choyi | H04L 29/12009 370/216 |
| 2007/0049323 | A1* | 3/2007 | Wang | H04W 12/12 455/525 |
| 2013/0019298 | A1* | 1/2013 | Jover Segura | H04L 63/101 726/7 |
| 2013/0040603 | A1* | 2/2013 | Stahlberg | H04L 63/14 455/410 |
| 2013/0288641 | A1* | 10/2013 | Parsons | H04L 63/1441 455/410 |

(Continued)

*Primary Examiner* — Thanhnga B Truong
(74) *Attorney, Agent, or Firm* — Han Santos, PLLC; John H. Lin

(57) ABSTRACT

Systems and techniques are provided for detecting rogue base stations and preventing malicious actors from intercepting and stealing data traffic from mobile devices through rogue base stations. Upon connecting to a newly detected base station for a cellular network service, a mobile device attempts to validate the cellular base station with a validation server before any data is transmitted over the new connection. If the mobile device does not receive a confirmation of validity from the validation server, the mobile device would identify the cellular base station as a rogue base station, disconnect from the rogue base station, and search for a valid base station for connection to the cellular network.

20 Claims, 10 Drawing Sheets

(56) References Cited

U.S. PATENT DOCUMENTS

2013/0344844 A1* 12/2013 Goldfarb ........... H04W 12/0013
455/411
2015/0121527 A1* 4/2015 Cho ...................... H04W 12/12
726/23

* cited by examiner

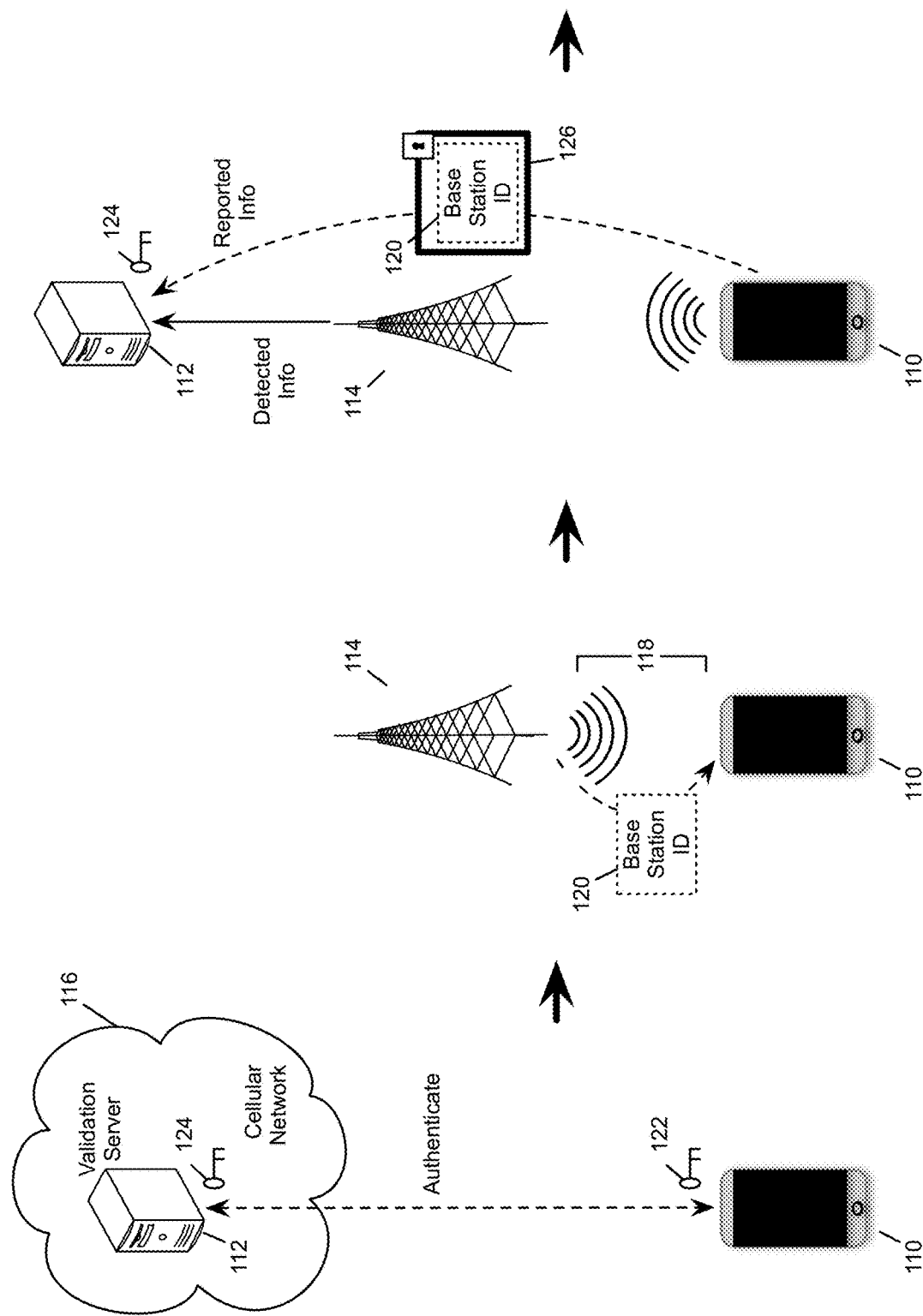

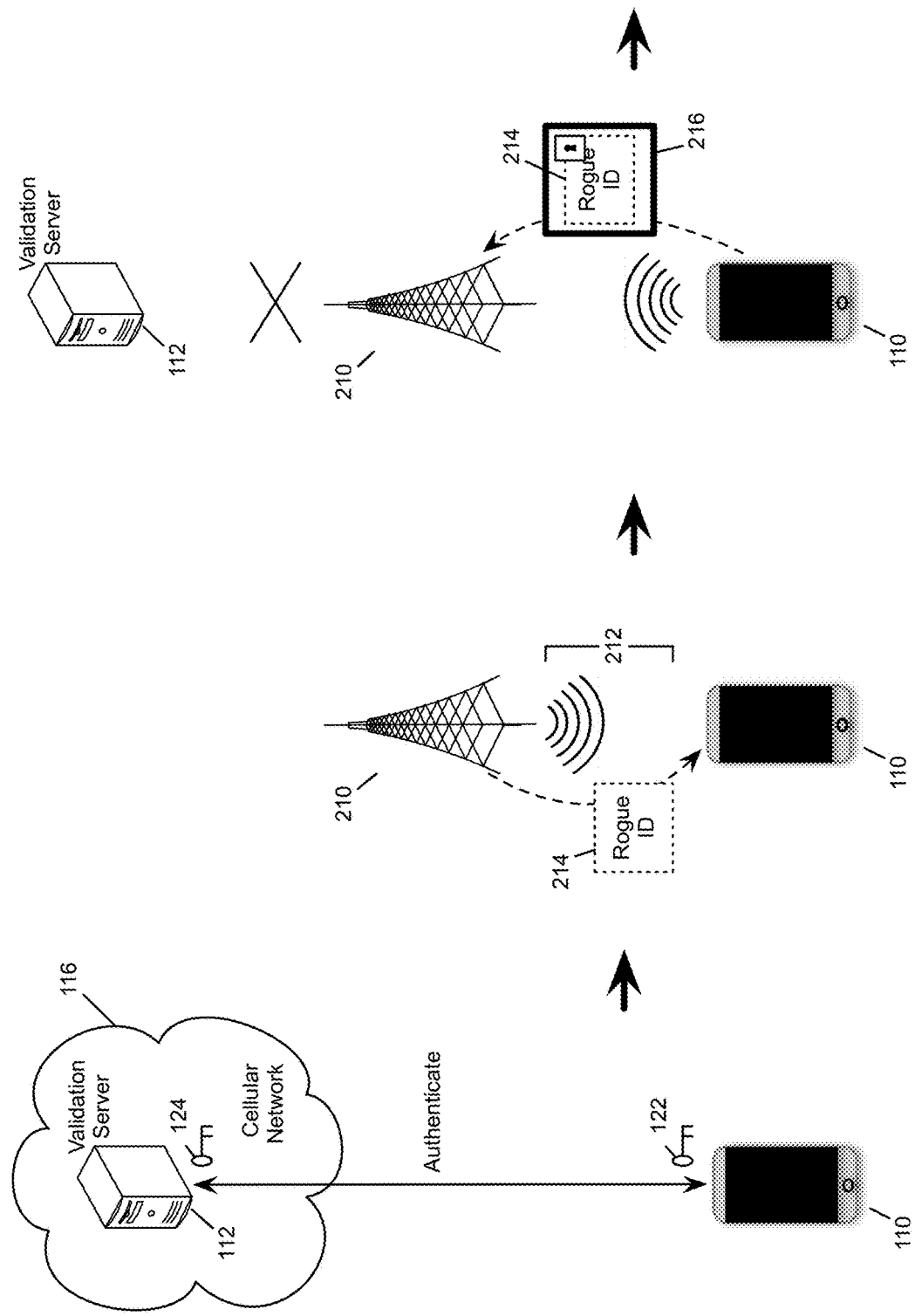

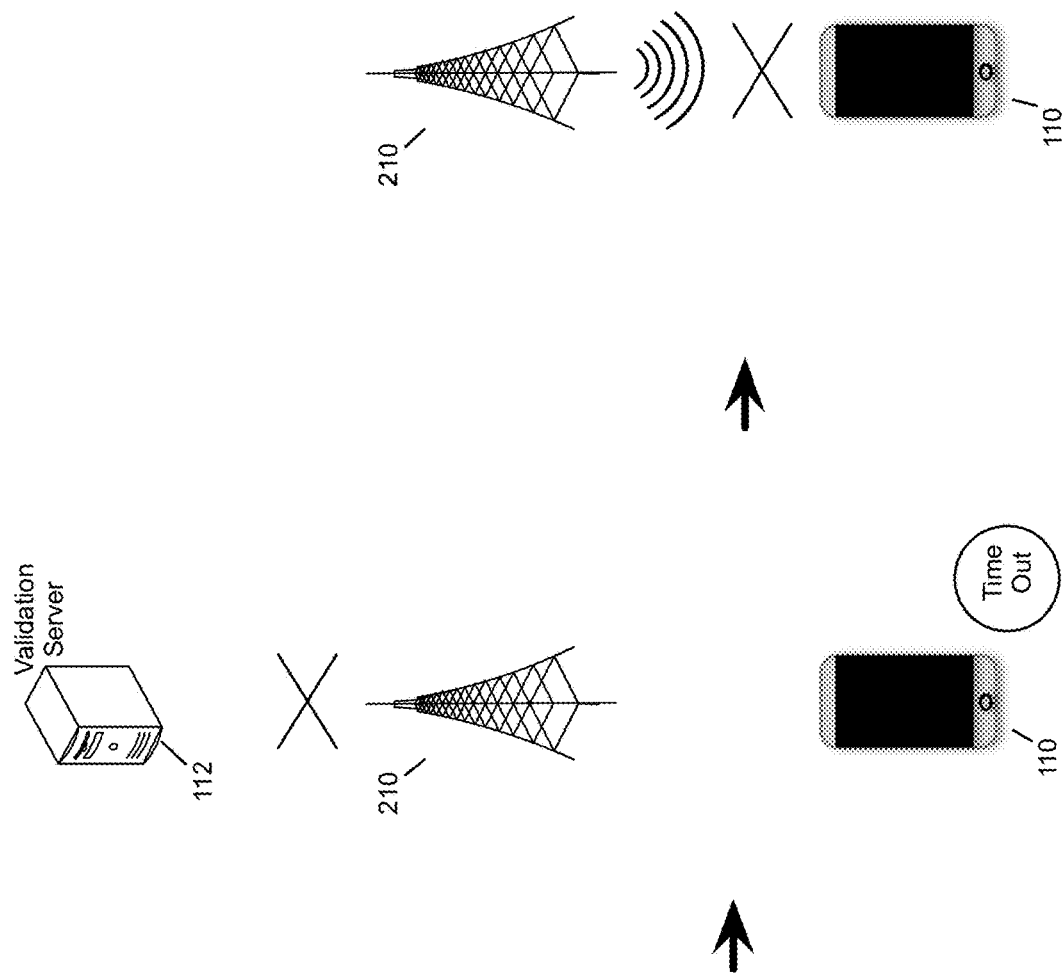

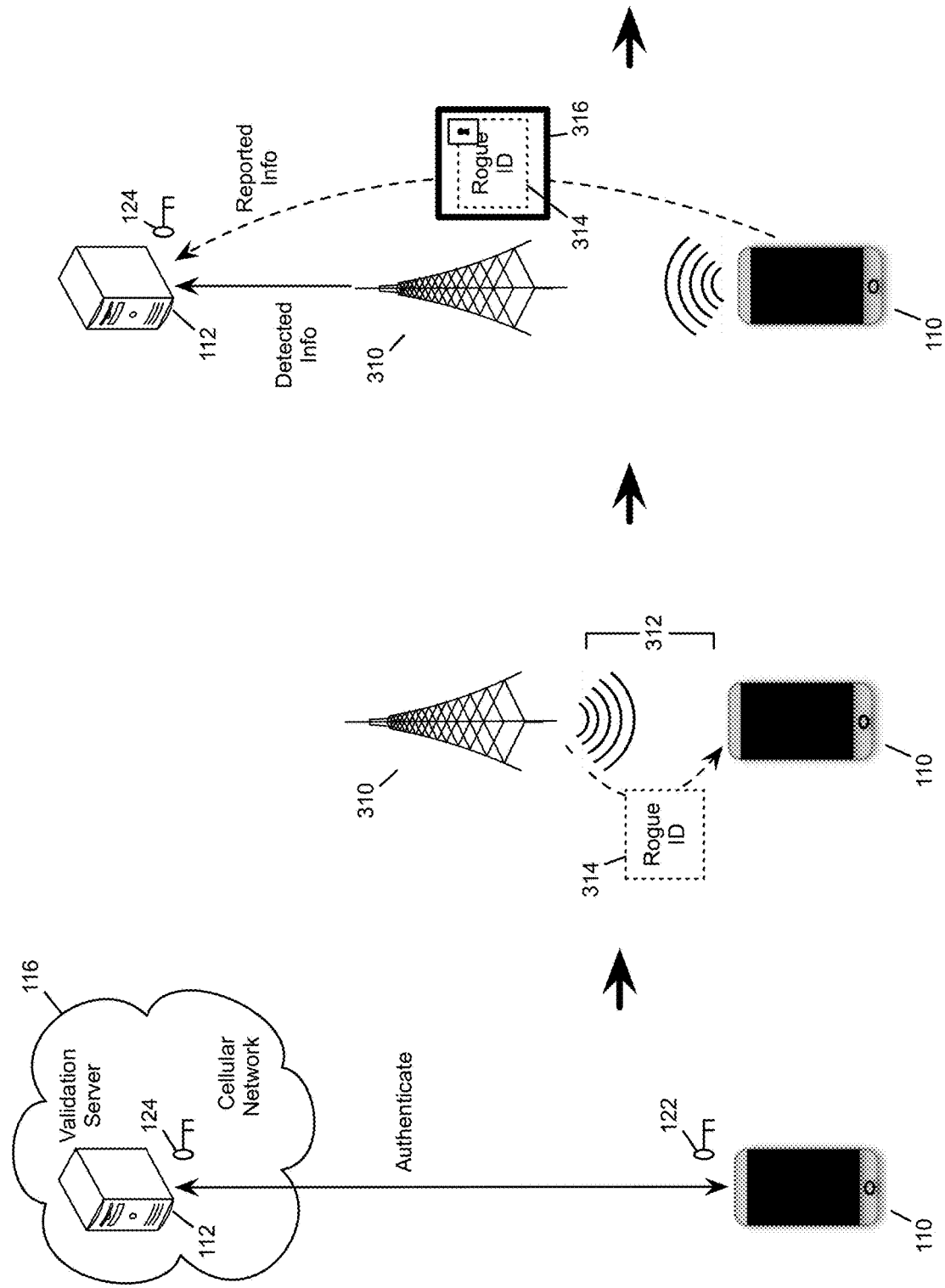

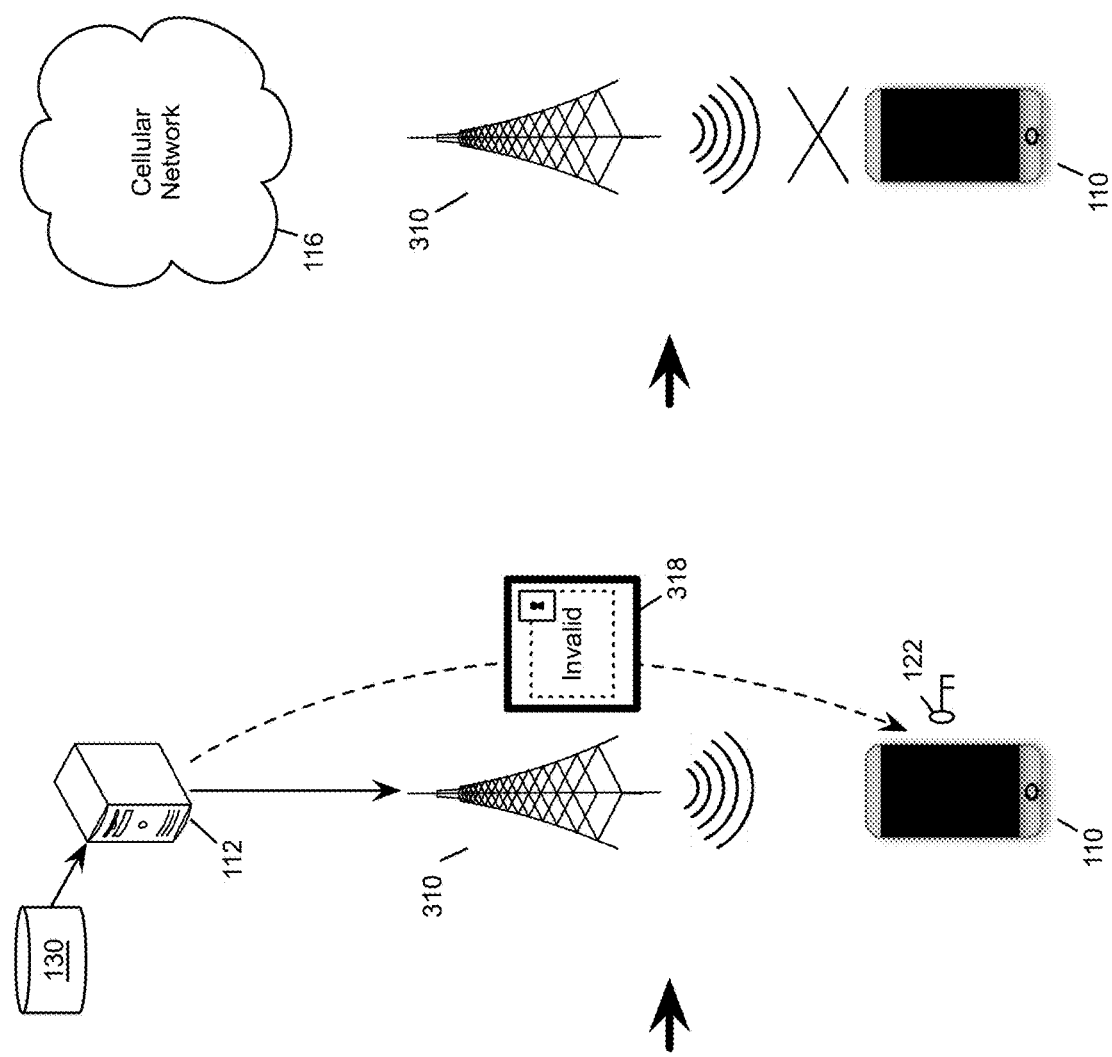

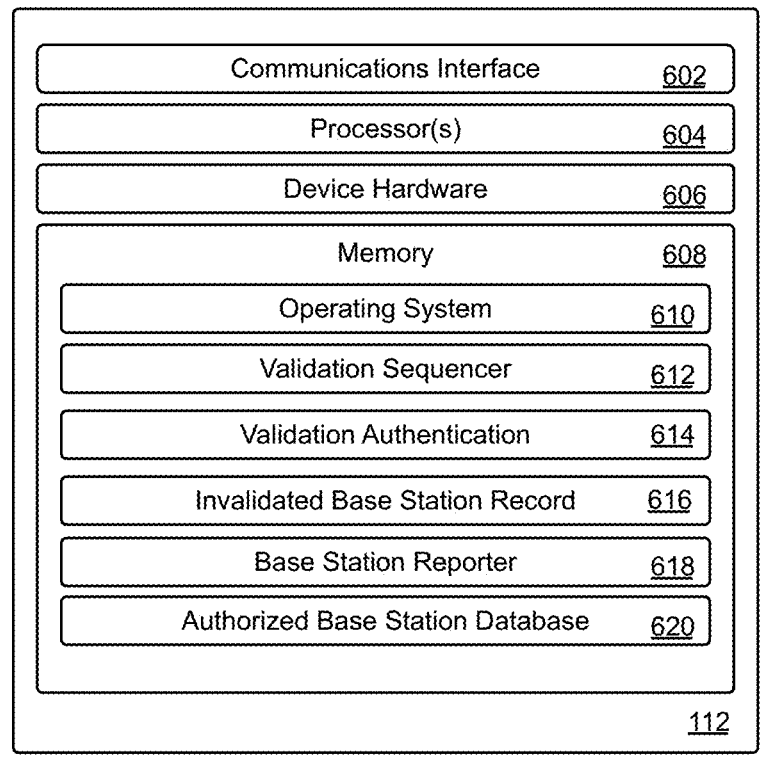
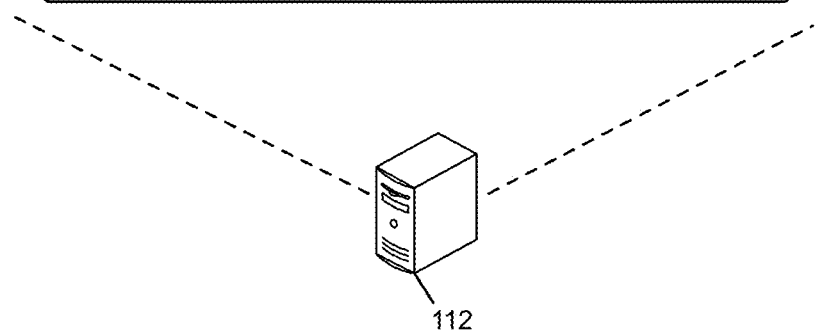
FIG. 6

NETWORK ASSISTED VALIDATION OF SECURE CONNECTION TO CELLULAR INFRASTRUCTURE

BACKGROUND

A rogue base station is an attacker station that pretends to be a legitimate base station. A malicious actor creates a false base station and induces legitimate mobile users of a cellular network to connect to it. A user whose handset is induced to communicate through a rogue base station may have his or her emails, text messages, passwords, and other data traffic carrying sensitive information intercepted and stolen.

The malicious actor may also launch a denial of service attack, making network resources unavailable to victim handsets. For example, the subscribing handset may authenticate itself through its certificate but the rogue base station intervenes and forces the handset to authenticate and tries to initiate a session by transferring an authorization key. The rogue base station generates its own authorization reply message containing its own self-generated authorization key. Hence, the rogue base station registers itself as a legitimate base station with the victim subscribing handset. This is referred to as a forgery attack.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

FIGS. 1A-1E conceptually illustrates a mobile device and a validation server performing validation of a cellular base station, consistent with an exemplary embodiment.

FIGS. 2A-2E conceptually illustrates the mobile device and the validation server performing validation of a rogue base station, consistent with an exemplary embodiment.

FIGS. 3A-3E conceptually illustrates the mobile device and the validation server performing validation of a rogue base station that is able to communicate with the validation server.

FIG. 6 is a block diagram showing various components of the example validation server, consistent with an embodiment of the disclosure.

DETAILED DESCRIPTION

Figure 1E:
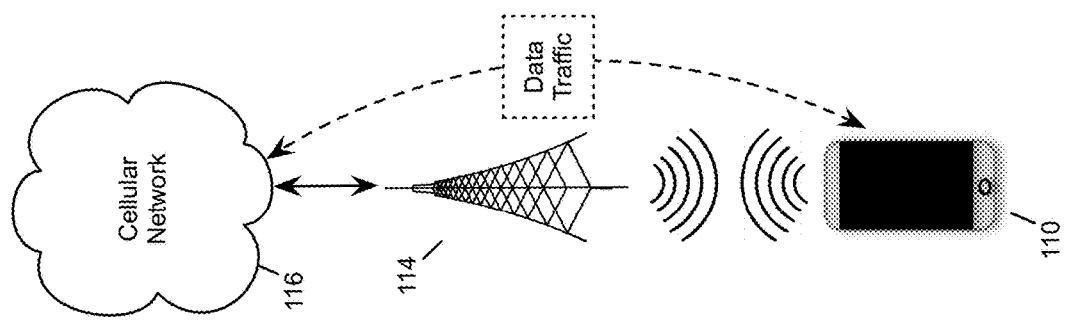

This disclosure is directed to systems and techniques for detecting rogue base stations and preventing malicious actors from intercepting and stealing data traffic from mobile devices through rogue base stations. In some embodiments, upon connecting to a newly detected base station for a cellular network service, a mobile device may attempt to validate the cellular base station with a validation server before any data is transmitted over the new connection. If the mobile device does not receive a confirmation of validity from the validation server, the mobile device would identify the cellular base station as a rogue base station, disconnect from the rogue base station, and search for a valid base station for connection to the cellular network.

FIGS. 1A-1E conceptually illustrates a mobile device 110 and a validation server 112 performing validation of a cellular base station 114, consistent with an exemplary embodiment. The validation of the cellular base station 114 is shown in five stages that correspond to FIG. 1A through FIG. 1E, respectively.

The mobile device 110 is a subscribing device of a cellular network 116. The mobile device 110 uses the services of the cellular network 116 by connecting with the base station 114, which provides wired or wireless connections to the cellular network 116. The cellular network 116 provides various services to the connected mobile devices, including access to the Internet. The cellular network 116 also provides resources available only to subscribers, such as the validation server 112.

The mobile device 110 can be a smart phone, PDA, tablet computer, or any type of computing device capable of communicating wireless data traffic with cellular networks and wireless local area networks (WLANs or Wi-Fi networks). The mobile device 110 may have a user account with a mobile network operator (MNO) or a wireless service provider of another type, allowing the mobile device to use publicly accessible wireless networks. The mobile device may also be referred to as a user device or a user equipment (UE).

The validation server 112 may be a physical computing device, such as a desktop computer, tablet computer, laptop computer, server, or other electronic device that is capable of receiving inputs, processing the inputs, and generating output data. The validation server 112 may also be a virtual computing device in the form of virtual machines or software containers that are hosted in a cloud.

FIG. 1A shows the first stage in which the mobile device 110 and the validation server 112 authenticate each other for the purpose of validating base stations that the mobile device 110 may encounter as it is moved to different places by its user. This authentication is conducted through a secure medium, such as a designated wired connection, a trusted base station, an encrypted wireless channel, or some other secure channel. This authentication operation establishes credentials (or keys) 122 and 124 at the mobile device 110 and the validation server 112, respectively. (The keys 122 and 124 may or may not be the same). The established credentials allow the mobile device and the validation server to exchange encrypted messages. Other devices or actors without the established credentials 122, 124, such as any rogue base stations, cannot easily decrypt these encrypted messages.

FIG. 1B shows the second stage in which the mobile device 110 initially encounters the cellular base station 114. The cellular base station 114 is a short-range transceiver that wirelessly connects mobile phone, computer, or other wireless device to a central hub and allows connection to a network. In the example illustrated, the cellular base station 114 provides connection between the mobile device 110 with the cellular network 116. The cellular base station 114 communicates with the cellular network 116 through a trusted, secure communications infrastructure that may be operated by the cellular network. The cellular base station 114 is also associated with a set of identifying information that is known to the validation server 112. Such information may include a unique identifier, an Internet address (IP address), geographical location, etc.

The mobile device 110 detects the cellular base station 114 while searching for a base station to connect to the cellular network 116. The mobile device 110 establishes a preliminary connection 118 with the cellular base station 114 and receives a base station identifier 120 from the cellular base station 114 through the preliminary connection 118. Prior to validation, the mobile device 110 considers the cellular base station 114 an unverified base station. The mobile device therefore suspends data transmission to the cellular network 116 by preventing data transmission through the preliminary connection with the cellular base station 114.

FIG. 1C shows the third stage in which the mobile device 110 performs validation of the cellular base station 114, specifically by sending a validation query message 126 that reports the cellular base station identifier 120 to the validation server 112. The validation query message may include other information, such as the geographic location of the mobile device 110. The validation query message 126 is encrypted such that the cellular base station 114 cannot decipher or alter its content. The mobile device may use the unverified base station 114 to relay the validation query message 126 to the validation server 112. In the example of FIG. 1, the cellular base station 114 is a legitimate base station of the cellular network 116, so it faithfully relays the validation query message 126 to the validation server 112 through the infrastructure of the cellular network 116. The encrypted validation query message 126 reaches the validation server 112, and the validation server uses the key 124 to decrypt the validation query message 126 and obtains the cellular base station identifier 120.

Figure 1D:
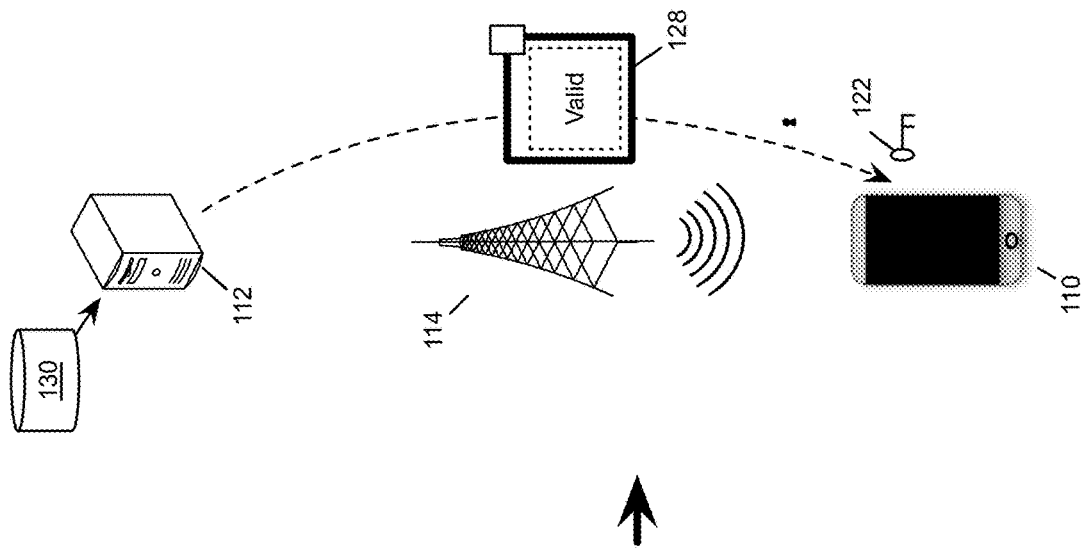

FIG. 1D shows the fourth stage in which the validation server 112 validates the cellular base station identifier 120 and sending a validation response message 128 to the mobile device 110. The validation server 112 validates the cellular base station identifier 120 based on a set of detected information and a set of reported information. The set of reported information refers to the content of the validation query message 126, which includes the cellular base station identifier 120 reported by the mobile device 110. The set of detected information refers to information detected by the cellular network 116 regarding the cellular base station 114, which is the cellular base station from which the validation query message 126 originated. Such detected information may include the geographic location of the cellular base station, the IP address of the cellular base station, and/or the authenticated credential between the cellular base station and the cellular network 116. Some of the detected information is detected based on communications link or physical network infrastructure between the cellular base station 114 and the cellular network 116.

The validation server 112 checks the set of reported information and/or the set of detected information against a database 130 of authorized base stations, specifically by looking up the cellular base station identifier 120 in the database. The database 130 records identifiers of authorized base stations, as well as information that the cellular network 116 is expected to detect from the authorized base stations. The information may include the geographic location of the cellular base stations, the IP address of the cellular base stations, and/or the authenticated credential between the cellular base stations and the cellular network 116. The information that the validation server 112 uses to check the cellular base station identifier 120 may also include a registration and state information. The registration and state information is information maintained by the cellular network 116 for each authorized base station. The cellular network updates the information for an authorized base station whenever the base station establishes a connection with a mobile device and reports to the cellular network.

Validation would fail if the reported base station identifier cannot be found in the database 130, or if the database 130 shows that an authorized base station having the reported base station identifier ought to have a different set of detected information (e.g., a different geographical location, a different IP address, a different authenticated credential, a different set of registration and state information) than what is actually detected from the cellular network. In other words, the validation server 112 would validate the cellular base station 114 if the validation server is able to find the reported base station identifier 120 in the database 130 and that the detected information of the cellular base station 114 matches what is stored in the database 130 for the cellular base station.

In the example of FIG. 1, the validation server 112 is able to validate the reported base station identifier 120. The validation server transmits a validation response message 128 indicating that the cellular base station identifier 120 is valid. The validation response message 128 is encrypted such that the cellular base station 114 cannot decipher or alter its content. The validation server may use the cellular base station 114 to relay the validation response message 128 to the mobile device 110. In the example of FIG. 1, the cellular base station 114 is a legitimate base station of the cellular network 116, so it faithfully relays the validation response message 128 to the mobile device 110.

FIG. 1E shows the fifth stage in which the mobile device conducts data traffic over the cellular base station 114 after the successful validation. Prior to the completion of the validation operation, the mobile device 110 had suspended the data traffic to the cellular network 116. The mobile device 110 now resumes data transmission to the cellular network 116 since the cellular base station 114 has been verified to be a legitimate base station of the cellular network 116.

FIGS. 2A-2E conceptually illustrates the mobile device 110 and the validation server 112 performing validation of a rogue base station 210, consistent with an exemplary embodiment. The validation of the cellular base station 210 is shown in five stages that correspond to FIG. 2A through FIG. 2E, respectively.

The rogue base station 210 is a short-range transceiver that is capable of connecting to some mobile devices, such as the mobile device 110. The rogue base station 210 pretends to be a legitimate base station of one or more cellular networks, such as the cellular network 116. It may not communicate with the cellular network 116 and may not actually forward messages to the cellular network 116 or the validation server 112. In order to appear legitimate, the rogue base station 210 may produce a bogus base station identifier.

The first stage FIG. 2A is similar to the stage shown in FIG. 1A. Specifically, the mobile device 110 and the validation server 112 authenticate each other to establish credentials (or keys) 122 and 124 at the mobile device 110 and at the validation server 112, respectively.

The second stage FIG. 2B shows the mobile device 110 initially encountering the rogue base station 210. The mobile device 110 detects the rogue base station 210 while searching for a base station to connect to the cellular network 116. The mobile device 110 establishes a preliminary connection 212 with the rogue base station 210 and receives a base station identifier 214 from the rogue base station 210 through the preliminary connection 212. Since the rogue base station 210 is unverified, the mobile device suspends data transmission to the cellular network 116 (by preventing data transmission through the preliminary connection with the rogue base station 210). If the mobile device 110 does not receive a base station identifier, the validation would fail.

The third stage FIG. 2C shows the mobile device 110 attempting to validate the rogue base station 210. The mobile device 110 sends a validation query message 216 that reports the cellular base station identifier 214 to the validation server 112. The validation query message 216 is encrypted so that the rogue base station 210 cannot decipher or alter its content. The mobile device 110 attempts to use the rogue base station 210 to relay the validation query message 216 to the validation server 112. However, the rogue base station 210 does not relay the validation query message 216 to the validation server 112, and the encrypted validation query message 216 does not reach the validation server 112. Since the rogue base station 210 does not have the key 124, it cannot alter or decipher the content of the validation query message 216.

The fourth stage FIG. 2D shows the mobile device 110 invalidating the rogue base station 210. Since the rogue base station did not relay the validation query message 216 to the validation server, the validation server 112 would not generate a validation response message. The rogue base station may transmit a bogus response message (not illustrated), but the bogus response message would not be properly encrypted and would be discarded by the mobile device 110. Regardless of whether the rogue base station 210 sends a bogus response message, the mobile device would time out while waiting for the validation response message. The cellular base station identifier 214 therefore fails validation because the mobile device 110 does not receive the validation result from the validation server 112 within a threshold time interval.

The fifth stage FIG. 2E shows the mobile device 110 severing the connection with the detected cellular base station because the received base station identifier 214 fails the validation. The mobile device 110 then continues to search for a base station for connecting to the cellular network 116. The transmission of data to the cellular network 116 remains suspended until the mobile device 110 is able to find and connect to a valid base station. In some embodiments, the mobile device may take other actions upon validation failure, for example, the mobile device 110 may prompt the user for a decision as to whether to remain connected to the cellular base station while providing a proper warning.

In some embodiments, the rogue base station is able to communicate with the cellular network 116 and therefore able to relay validation query message and validation response message to and from the validation server 112. In these instances, the mobile device would rely on the content of the validation response message to determine whether the connected base station is a rogue base station.

FIGS. 3A-3E conceptually illustrates the mobile device 110 and the validation server 112 performing validation of a rogue base station 310 that is able to communicate with the validation server. The validation of the cellular base station 310 is shown in five stages that correspond to FIG. 3A through FIG. 3E, respectively.

The rogue base station 310 pretends to be a legitimate base station of one or more cellular networks. Unlike the rogue base station 210, the rogue base station 310 is able to communicate with the cellular network 116. The rogue base station 310 is therefore able to forward messages between the validation server 112 and the mobile device 110.

The first stage FIG. 3A is similar to the stage shown in FIG. 1A. Specifically, the mobile device 110 and the validation server 112 authenticate each other to establish credentials (or keys) 122 and 124 at the mobile device 110 and at the validation server 112, respectively.

The second stage FIG. 3B shows the mobile device 110 initially encountering the rogue base station 310. The mobile device 110 detects the rogue base station 310 while searching for a base station to connect to the cellular network 116. The mobile device 110 establishes a preliminary connection 312 with the rogue base station 310 and receives a base station identifier 314 from the rogue base station 310 through the preliminary connection 312. Since the rogue base station 310 is unverified, the mobile device suspends data transmission to the cellular network 116 (by preventing data transmission through the preliminary connection 312 with the rogue base station 310).

The third stage FIG. 3C shows the mobile device 110 performing validation of the cellular base station 310, specifically by sending a validation query message 316 that reports the cellular base station identifier 314 to the validation server 112. The validation query message may include other information, such as the geographic location of the mobile device 110. The validation query message 316 is encrypted such that the cellular base station 310 cannot decipher or alter its content. The mobile device may use the unverified base station 310 to relay the validation query message 316 to the validation server. Even though the cellular base station 310 is a rogue base station, it is able to communicate with the cellular network 116 and the validation server 112. The rogue base station 310 can therefore relay the validation query message 316 to the validation server 112, but the rogue base station 310 cannot decipher nor alter the content of the encrypted validation query message 316 since it does not have the key 124. The encrypted validation query message 316 reaches the validation server 112, and the validation server uses the key 124 to decrypt the validation query message 316 and obtains the cellular base station identifier 314.

The fourth stage FIG. 3D shows the validation server 112 invalidating the cellular base station identifier 314 and sending a validation response message 318 to the mobile device 110. The validation server 112 performs validation of the cellular base station 310 based information reported by the validation query message 126 (reported information) and information detected by the cellular network 116 regarding the cellular base station 310 (detected information). The validation server 112 checks the reported information and/or the detected information against the database 130 of authorized base stations, specifically by looking up the cellular base station identifier 314 in the database or to query for the corresponding registration and state information.

Since the cellular base station 310 is a rogue base station, the validation would fail because the cellular base station identifier 310 cannot be found in the database 130, or because the database 130 shows that an authorized base station having the cellular base station identifier 314 ought to exhibit a different geographical location, a different IP address, or a different authentication credential than what is detected by the cellular network 116. The validation may also fail because the base station 310 is a rogue base station that does not have a proper corresponding registration and state information in the cellular network (since it can never report a connection by a mobile device.) The validation server 112 thereafter transmits a validation response message 318 indicating that the cellular base station identifier 314 is invalid.

The validation response message 318 is encrypted such that the cellular base station 310 cannot decipher or alter its content. The rogue base station 310 may relay the validation response message 318 to the mobile station, in which case the mobile device would know that the cellular base station identifier 314 is invalid and the validation of the cellular base station 310 would fail. If the rogue base station 310 fails to relay the validation response message 318, the mobile device 110 would time out and the validation of the cellular base station 310 would fail. If the rogue base station 310 replaces the validation response message 318 with a bogus message, the mobile device 110 would disregard the bogus message for not being properly encrypted.

The fifth stage FIG. 3E shows the mobile device 110 severing the connection with the detected cellular base station 310 because the cellular base station identifier 314 provided by the rogue base station 310 fails the validation. The mobile device 110 then continues to search for a base station for connecting to the cellular network 116. The transmission of data to the cellular network 116 remains suspended until the mobile device 110 is able to find and connect to a valid base station.

Though not illustrated, the mobile device 110 also records information based on its interactions with rogue base stations, such as the rogue base station identifiers 214 and/or 314 and the geographic location of the mobile device 110 when it encounters the rogue base stations 210 and/or 310. The mobile device 110 would report the recorded information to the validation server 112 once the mobile device 110 connects to a valid base station of the cellular network 116. The validation server 112 collects data regarding rogue base stations reported from mobile devices in the field (such as the mobile device 110) and generates a report identifying the detected rogue base stations.

The system and technique described by reference to FIGS. 1A-1E, 2A-2E, and 3A-3E may also be used to identify legitimate base stations that are defective. Such a defective station may fail to forward validation query and response messages between validation server and mobile devices, or fail to provide a valid base station identifier due to malfunctioning. The mobile device 110 would report such defective base stations to the validation server 112 as invalid base stations along with detected rogue base stations.

Example Mobile Device

Figure 4:
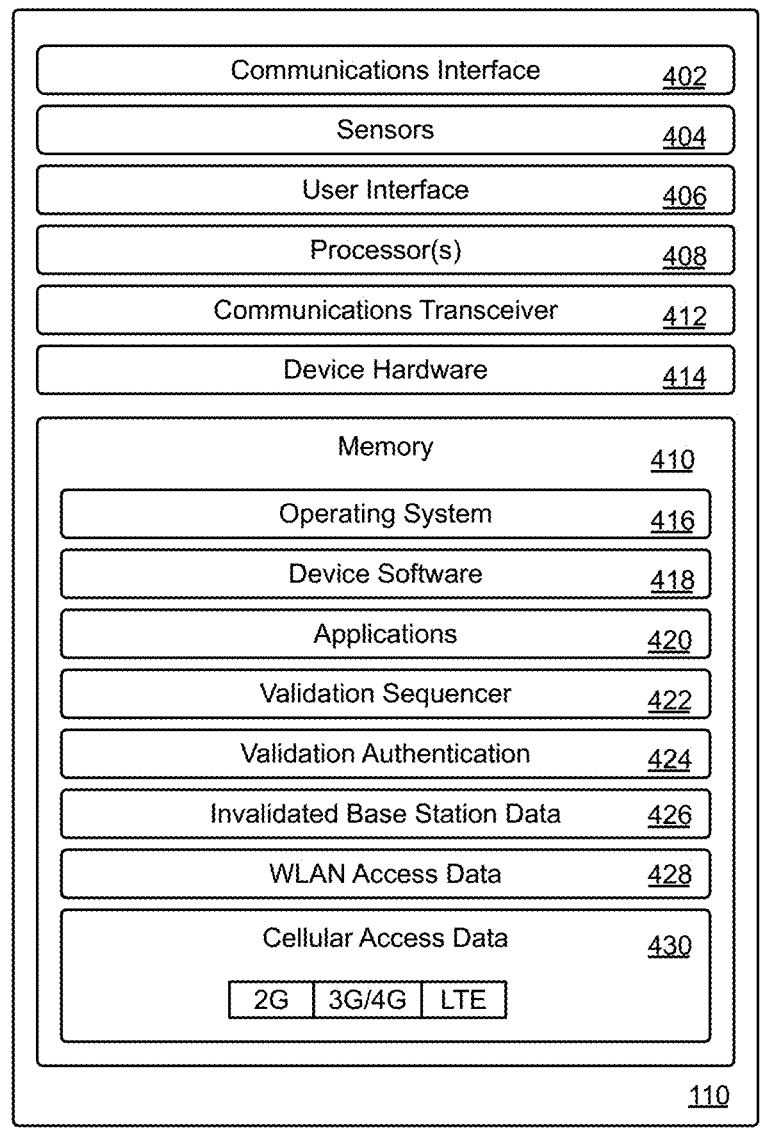
FIG. 4 is a block diagram showing various components of the mobile device, consistent with an exemplary embodiment.

FIG. 4 is a block diagram showing various components of the mobile device 110, consistent with an exemplary embodiment. The mobile device 110 is an electronic device configured to perform validation of cellular base stations by exchanging validation messages with the validation server 112.

The mobile device 110 (or UE, or user device) may include a communications interface 402, one or more sensors 404, a user interface 406, one or more processors 408, and memory 410. The communications interface 402 may include wireless and/or wired communication components that enable the mobile device 110 to transmit or receive voice or data communication over cellular networks and/or Wi-Fi networks.

The sensors 404 may include a proximity sensor, a compass, an accelerometer, altimeter, cameras, and/or a global positioning system (GPS) sensor. The proximity sensor may detect movement of objects that are proximate the mobile device 110. The compass, the accelerometer, and the GPS sensor may detect orientation, movement, and geolocation of the mobile device 110.

The user interface 406 may enable a user to provide inputs and receive outputs from the mobile device 110. The user interface 406 may include a data output device (e.g., visual display, audio speakers), and one or more data input devices. The data input devices may include, but are not limited to, combinations of one or more of keypads, keyboards, mouse devices, touch screens, microphones, speech recognition packages, and any other suitable devices or other electronic/software selection methods.

The memory 410 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital optical disks or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The mobile device 110 may also include communications transceivers 412 and other device hardware 414. The communication transceivers are hardware components that enable the mobile device 110 to perform telecommunication and data communication with the multiple communications networks, such as wireless networks behind hotspots. The device hardware 414 may include other hardware that is typically located in a mobile telecommunication device. For example, the device hardware 414 may include signal converters, transceivers, antennas, hardware decoders and encoders, graphic processors, a SIM card slot, and/or the like that enable the mobile device 110 to execute applications and provide telecommunication and data communication functions. An integrated circuit chip such as a SIM may be inserted into the SIM card slot of the mobile device 110. Alternatively, an embedded SIM may be hardwired into the circuit board of the mobile device 110.

The one or more processors 408 and the memory 410 of the mobile device 110 may implement an operating system 416, device software 418, one or more applications 420, a validation sequencer 422, and a validation authentication module 424. The memory 410 also stores invalidated base station data 426, Wi-Fi access data 428, and cellular access data 430.

The various software and applications may include routines, program instructions, objects, and/or data structures that perform particular tasks or implement particular abstract data types. The operating system 416 may include components that enable the mobile device 110 to receive and transmit data via various interfaces (e.g., user controls, communications interface 402, and/or memory input/output devices). The operating system 416 may also process data using the one or more processors 408 to generate outputs based on inputs that are received via the user interface 206. For example, the operating system 416 may provide an execution environment for the execution of the applications 420. The operating system 416 may include a presentation component that presents the output (e.g., display the data on an electronic display, store the data in memory, transmit the data to another electronic device, etc.).

The operating system 416 may include an interface layer that enables applications to interface with the communication transceivers 412 and/or the communications interface 402. The interface layer may comprise public APIs, private APIs, or a combination of both public APIs and private APIs. Additionally, the operating system 416 may include other components that perform various other functions generally associated with an operating system.

The device software 418 may include software components that enable the user device to perform functions. For example, the device software 418 may include basic input/output system (BIOS), Boot ROM, or a bootloader that boots up the mobile device 110 and executes the operating system 416 following power up of the device.

The applications 420 may include applications that provide utility, entertainment, and/or productivity functionalities to a user of the mobile device 110. The applications 420 may further include electronic mail applications, remote desktop applications, web browser applications, navigation applications, office productivity applications, multimedia streaming applications, and/or so forth.

The validation sequencer 422 is a program that controls the sequence of message exchanges for validation of base stations. The validation authentication module 424 is a program that performs encryption of outgoing messages to the validation server and decryption of incoming messages from the validation server. In some embodiments, the validation sequencer 422 and the validation authentication module 424 are components of the operating system 416.

Together, the validation sequencer 422 and the validation authentication module 424 perform mutual authentication (FIGS. 1A, 2A, and 3A) to establish credentials for exchanging validation messages with the validation server 112. The validation sequencer 422 and the validation authentication module 424 also encrypt outgoing validation query messages (e.g., messages 126, 216, and 316) and decrypt incoming validation response messages (e.g., messages 128, 232, and 318). Any data generated or collected during the mobile device's connection with rogue or defective stations, such as base station identifiers and GPS coordinates are stored as invalidated base station data 426 in the memory 410. The validation sequencer reports the stored invalidated base station data 426 to the validation server 112 when the mobile device 110 is connected to a valid base station of the cellular network 116.

Figure 5:
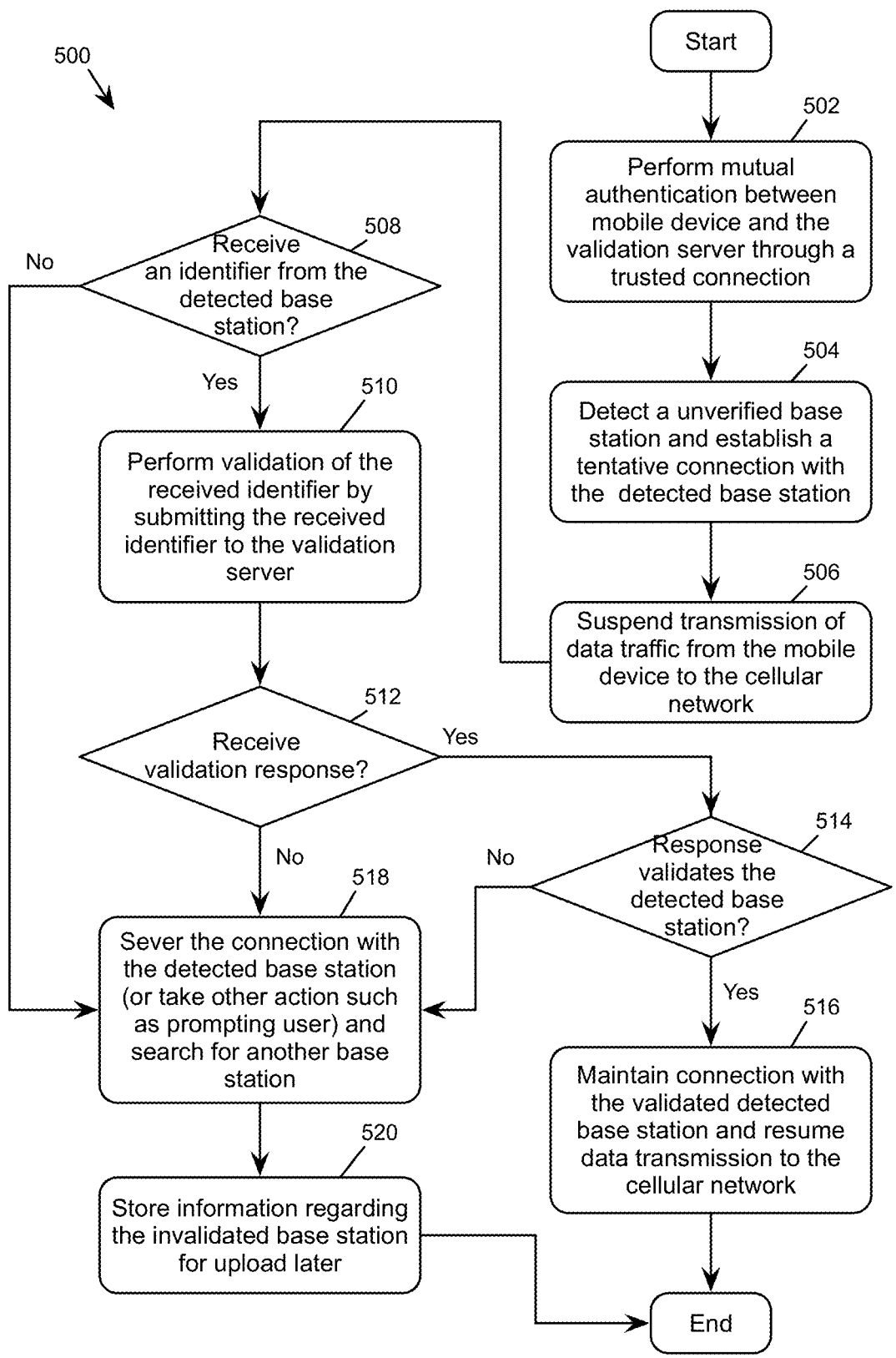
FIG. 5 conceptually illustrates a process for performing validation of base stations of a cellular network by a subscribing mobile device.

FIG. 5 conceptually illustrates a process 500 for performing validation of base stations of a cellular network by a subscribing mobile device. The process 500 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like, that perform particular functions or implement particular abstract data types. The order in which the operations are described is not intended to be construed as a limitation, and any number of the described blocks can be combined in any order and/or in parallel to implement the process. In some embodiments, the mobile device 110 performs the process 500.

At block 502, while on a trusted connection with the cellular network, the mobile device performs mutual authentication with the validation server. This establishes keys for encrypting and decrypting validation messages to and from the validation server through base stations, including unverified base stations that may be rogue base stations.

At block 504, the mobile device detects an unverified base station and establishes a preliminary connection with the detected base station.

At block 506, the mobile device suspends transmission of data traffic to the cellular network. This is to prevent interception of data by the detected base station, which may be a rogue base station.

At block 508, the mobile device determines whether it has received a base station identifier from the detected base station (e.g., whether the mobile device has received the identifier within a threshold timing interval.) If the mobile device has received a base station identifier, the process proceeds to 510. If the mobile device does not receive a base station identifier from the detected base station, the process proceeds to 518.

At block 510, the mobile device performs validation of the received base station identifier by submitting the received identifier to the validation server. The mobile device creates a validation query message (e.g., query message 126) that includes the received base station identifier and other information (e.g., geographic location of the mobile device.) The mobile device encrypts the validation query message based on the mutual authentication with the validation server. The validation query message is transmitted to the detected base station for delivery to the validation server.

At block 512, the mobile device determines whether it has received a validation response from the validation server (e.g., whether the mobile device has received a validation response message within a threshold timing interval). The mobile device may ignore messages that are not properly encrypted. If the mobile device has received a validation response message, the process proceeds to 514. If the mobile device does not receive a validation response message from the detected base station, the process proceeds to 518.

At block 514, the mobile device determines whether the validation response validates the detected base station. If the content of the validation response message indicates that the detected base station is invalidated (because the submitted base station identifier is invalid), the process proceeds to 518. If the content of the validation response message indicates that the detected base station is valid (because the submitted base station identifier is valid), the process proceeds to 516.

At block 516, the mobile device maintains connection with the detected base station, which is now validated. The mobile device may resume data transmission to the validated base station. The mobile device may also upload any stored information regarding invalidated base stations detected previously. The process 500 then ends.

At block 518, the mobile device severs the preliminary connection with the detected base station. At this point of the process, the mobile device has invalidated the detected base station as a rogue base station or a defective base station because the mobile device is not able to validate the cellular base station using a base station identifier. In some embodiments, the mobile device may take other actions upon validation failure, such as prompting the user for a decision while providing proper warning. The mobile device also searches for another base station to connect to the cellular network.

At block 520, the mobile device stores information (as invalidated base station data 426) regarding the invalidated base station for later upload to the validation server or another server in the cellular network 116. This information may include the received base station identifier of the invalidated base station, the geographical location (e.g., GPS) captured during the connection with the invalidated station, a time stamp captured during the connection with the invalidated station, and other information. The process 500 then ends.

Example Validation Server

FIG. 6 is a block diagram showing various components of the example validation server 112, consistent with an embodiment of the disclosure. The validation server 112 is configured to perform validation of base stations by exchanging validation messages with mobile devices such as the mobile device 110.

The figure illustrates the validation server 112 implemented in a computing device. The validation server 112 may be a general purpose computer, such as a desktop computer, tablet computer, laptop computer, server, or other electronic devices that are capable of receiving inputs, processing the inputs, and generating output data. The validation server 112 may also be a virtual computing device in the form of virtual machines or software containers that are hosted in a cloud.

The validation server 112 may be equipped with a communications interface 602, one or more processors 604, device hardware 606, and memory 608. The communications interface 602 may include wireless and/or wired communication components that enable the computing devices to transmit data to and receive data from other devices, whether through a dedicated wired connection or via a communications network. The device hardware 606 may include additional hardware that performs user interface, data display, data communication, data storage, and/or other server functions.

The memory 608 may be implemented using computer-readable medium, such as computer storage medium. Computer-readable medium includes, at least, two types of computer-readable media, namely computer storage media and communications media. Computer storage media may include volatile and non-volatile, removable and non-removable media implemented in any method or technology for storage of information such as computer-readable instructions, data structures, program modules, or other data. Computer storage media may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The processors 604 and the memory 608 of the computing devices 600 may implement an operating system 610, a validation sequencer 612, a validation authentication module 614, an invalidated base station record 616, a base station reporter 618, and a database storage 620. In some embodiments, the validation sequencer 612, the validation authentication module 614, and the cellular base station reporter 618 are components of the operating system 610.

The operating system 610 may include components that enable the computing devices 600 to receive and transmit data via various interfaces (e.g., user controls, communications interface, and/or memory input/output devices), as well as process data using the processors 604 to generate output. The operating system 610 may include a presentation component that presents the output (e.g., display the data on an electronic display, store the data in memory, transmit the data to another electronic device, etc.). Additionally, the operating system 610 may include other components that perform various additional functions generally associated with an operating system.

The validation sequencer 612 is a program that controls the sequence of message exchanges for validation of base stations. The validation authentication module 614 is a program that performs encryption of outgoing messages to subscribing mobile devices and decryption of incoming messages from the subscribing mobile devices.

Together, the validation sequencer 612 and the validation authentication module 614 perform mutual authentication (FIGS. 1A, 2A, 3A) with subscribing mobile devices to establish credentials or keys for exchanging validation messages. The validation sequencer 612 and the validation authentication module 614 also decrypt incoming validation query messages (messages 126, 216, and 316) and encrypt outgoing validation response messages (messages 128, 232, and 318). For each received base station identifier in a validation query message, the validation sequencer 612 uses the content of the database storage 620 to determine whether to validate or invalidate the corresponding base station. The database storage 620 implements the authorized base station database 130.

The cellular base station reporter 618 is a program that collects reports of invalidated base stations from mobile devices. These reports may include geographic locations, time stamps, base station identification, and other information collected by mobile devices when they connect to base stations that failed validation. The cellular base station reporter 618 in turn compiles a report based on the collected information, which can be used to identify and locate rogue base stations and/or malfunctioning base stations. For example, the cellular base station reporter 618 may generate a two-dimensional geographical map showing the physical location of the reported rogue base stations and malfunctioning base stations, their purported base station identifiers, and/or the time of their detection by mobile devices.

Figure 7:
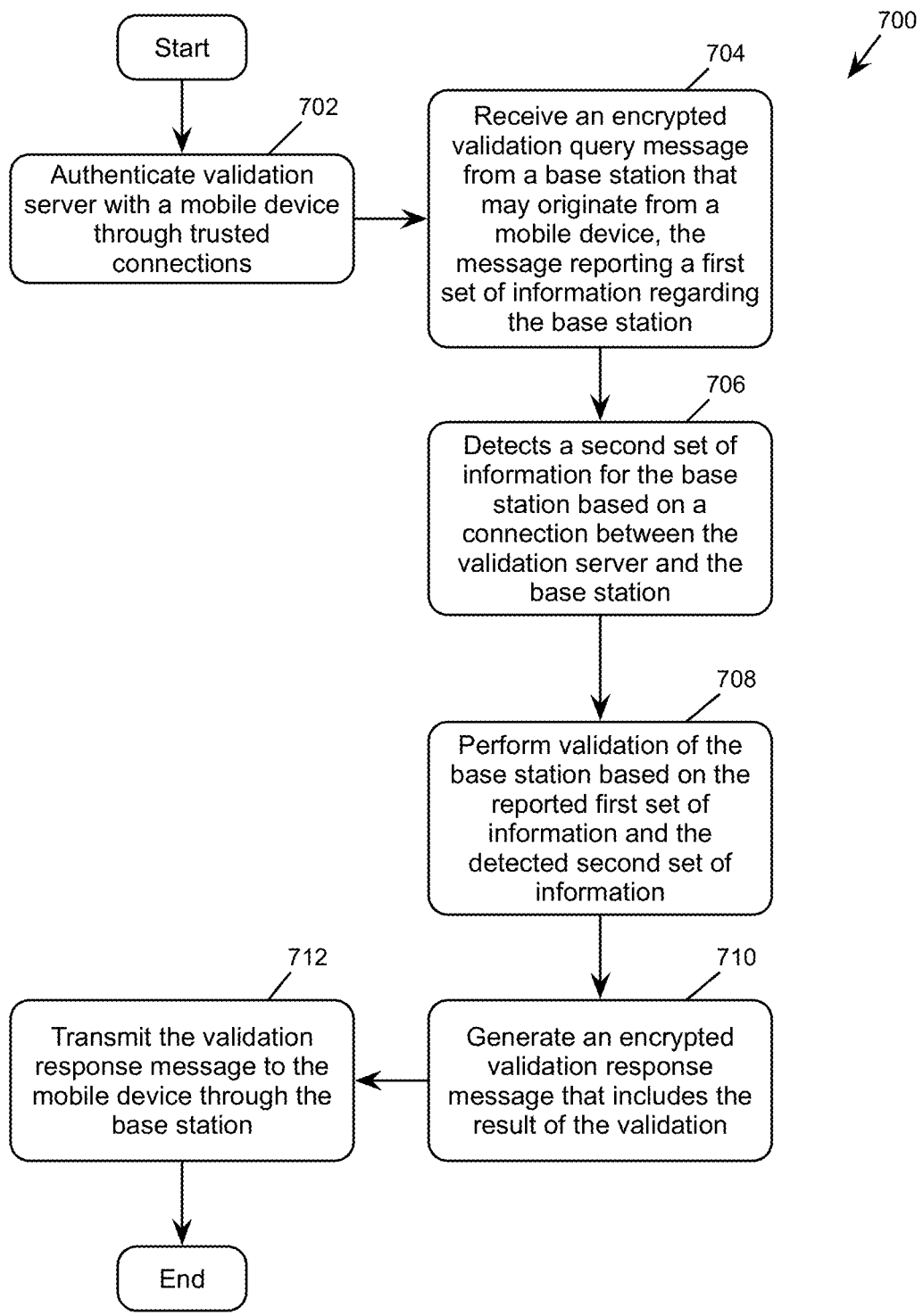
FIG. 7 conceptually illustrates a process for performing validation of base stations of a cellular network by a validation server.

FIG. 7 conceptually illustrates a process 700 for performing validation of base stations of a cellular network by the validation server 112. The process 700 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like, that perform particular functions or implement particular abstract data types. The order in which the operations are described is not intended to be construed as a limitation, and any number of the described blocks can be combined in any order and/or in parallel to implement the process. In some embodiments, the validation server 112 performs the process 700.

At block 702, while on a trusted connection with a mobile device, the validation server performs mutual authentication with the mobile device. This establishes keys for encrypting and decrypting validation messages to and from the mobile device through base stations, including unverified base stations that may be rogue base stations.

At block 704, the validation server receives an encrypted validation query message from a base station. The validation query message may originate from a mobile device seeking to validate the cellular base station. The validation query message reports a first set of information regarding the cellular base station. The first set of information includes a base station identifier that is to be validated.

At block 706, the validation server detects a second set of information for the cellular base station based on a connection between the validation server and the cellular base station. The second set of information refers to information detected by the cellular network regarding the cellular base station from which the validation query message originates. Such information may include the geographic location of the cellular base station, the IP address of the cellular base station, and/or the authenticated credential between the cellular base station and the cellular network. Some of the detected information is detected based on a communications link or a physical connection between the cellular base station and the cellular network.

At block 708, the validation server performs validation of the cellular base station based on the reported first set of information and the detected second set of information. In some embodiments, the validation server checks the set of reported information and/or the set of detected information based on a database of authorized base stations. Validation would fail if the reported base station identifier cannot be found in the database, or if the database shows that an authorized base station having the reported base station identifier ought to have a different set of detected information (e.g., a different geographical location, a different IP address, a different authenticated credential) than what is actually detected from the cellular network. Validation would pass if the validation server is able to find the reported base station identifier in the database and that the detected information of the cellular base station matches what is stored in the database.

At block 710, the validation server generates an encrypted validation response message that includes the result of the validation.

At block 712, the validation server transmits the validation response message to the inquiring mobile device through the cellular base station. The transmitted response message is encrypted for the mobile device such that the intervening base station cannot easily decipher or modify its content. The process 700 then ends.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media of a mobile device storing computer-executable instructions that upon execution cause one or more processors to perform acts comprising:
    detecting, by a mobile device, a cellular base station;
    requesting an identifier of the cellular base station via a connection with the detected cellular base station;
    severing the connection with the detected cellular base station when the mobile device does not receive the identifier of the cellular base station within a threshold time interval;
    submitting the received identifier to a validation server by sending a message containing the received identifier to the validation server through the connection with the detected cellular base station;
    severing the connection with the detected cellular base station when the mobile device does not receive a validation result from the validation server within a threshold time interval; and
    severing the connection with the detected cellular base station when the validation server indicates that the validation of the received identifier fails.

2. The one or more non-transitory computer-readable media of claim 1, wherein the execution of the instructions further causes the one or more processors to suspend transmission of data traffic by the mobile device until the validation of the detected cellular base station.

3. The one or more non-transitory computer-readable media of claim 1, wherein the validation server indicates whether the validation of the received identifier fails by providing the validation result.

4. The one or more non-transitory computer-readable media of claim 1, wherein the message containing the received identifier is an encrypted message that is authenticated between the mobile device and the validation server prior to detecting the cellular base station.

5. The one or more non-transitory computer-readable media of claim 1, wherein the validation result is received from the validation server through an encrypted message that is authenticated between the mobile device and the validation server.

6. The one or more non-transitory computer-readable media of claim 5, wherein the encrypted message containing the validation result is received through the connection with the cellular base station.

7. The one or more non-transitory computer-readable media of claim 1, wherein the execution of the instructions further causes the one or more processors to upload information collected from the cellular base station to a server in the cellular network through another base station, wherein the information comprises a geographical position captured by the mobile device during the connection with the detected cellular base station.

8. A computer-implemented method, comprising:
    detecting, by a mobile device, a cellular base station;
    requesting an identifier of the cellular base station via a connection with the detected cellular base station;
    determining whether the mobile device receives the identifier of the cellular base station within a first threshold time interval;
    if the mobile device does not receive the identifier of the cellular base station within the first threshold time interval, severing the connection with the detected cellular base station;
    if the mobile device receives the identifier of the cellular base station within the first threshold time interval, then:
        submitting the received identifier to a validation server by sending a message containing the received identifier to the validation server through the connection with the detected cellular base station;
        determining whether the mobile device receive a validation result from the validation server within a second threshold time interval;
        if the mobile device does not receive a validation result from the validation server within the second threshold time interval, severing the connection with the detected cellular base station;

if the mobile device does receive a validation result from the validation server within the second threshold time interval, then:
determining whether the validation server indicates that the validation of the received identifier fails; and
if the validation server indicates that the validation of the received identifier fails, severing the connection with the detected cellular base station.

9. The computer-implemented method of claim 8, further comprising suspending transmission of data traffic by the mobile device until the validation of the detected cellular base station.

10. The computer-implemented method of claim 8, wherein the message containing the received identifier is an encrypted message that is authenticated between the mobile device and the validation server prior to detecting the cellular base station.

11. The computer-implemented method of claim 8, wherein the validation result is received from the validation server through an encrypted message that is authenticated between the mobile device and the validation server.

12. The computer-implemented method of claim 8, further comprising uploading information collected from the cellular base station to a server in the cellular network through another base station, wherein the information comprises a geographical position captured by the mobile device during the connection with the detected cellular base station.

13. The computer-implemented method of claim 8, wherein the encrypted message containing the validation result is received through the connection with the cellular base station.

14. A mobile device comprising:
one or more processors; and
a non-transitory computer-readable medium storing a plurality of computer-executable components that are executable by the one or more processors to perform a plurality of actions, the plurality of actions comprising:
detecting, by a mobile device, a cellular base station;
requesting an identifier of the cellular base station via a connection with the detected cellular base station;
severing the connection with the detected cellular base station when the mobile device does not receive the identifier of the cellular base station within a threshold time interval;
submitting the received identifier to a validation server by sending a message containing the received identifier to the validation server through the connection with the detected cellular base station;
severing the connection with the detected cellular base station when the mobile device does not receive a validation result from the validation server within a threshold time interval; and
severing the connection with the detected cellular base station when the validation server indicates that the validation of the received identifier fails.

15. The mobile device of claim 14, wherein a plurality of actions further comprise suspending transmission of data traffic by the mobile device until the validation of the detected cellular base station.

16. The mobile device of claim 14, wherein the message containing the received identifier is an encrypted message that is authenticated between the mobile device and the validation server prior to detecting the cellular base station.

17. The mobile device of claim 14, wherein the validation result is received from the validation server through an encrypted message that is authenticated between the mobile device and the validation server.

18. The mobile device of claim 17, wherein the encrypted message containing the validation result is received through the connection with the cellular base station.

19. The mobile device of claim 14, wherein a plurality of actions further comprise uploading information collected from the cellular base station to a server in the cellular network through another base station, wherein the information comprises a geographical position captured by the mobile device during the connection with the detected cellular base station.

20. The mobile device of claim 14, wherein the validation server indicates whether the validation of the received identifier fails by providing the validation result.

\* \* \* \* \*